(12) United States Patent
Oswald

(10) Patent No.: US 6,769,538 B2
(45) Date of Patent: Aug. 3, 2004

(54) SELECTIVELY CONFIGURABLE HOUSEHOLD ACCESSORY HOLDER

(76) Inventor: Charlane Marie Oswald, 5700 Indiana St., Golden, CO (US) 80403

( * ) Notice: Subject to any disclaimer, the term of this patent is extended or adjusted under 35 U.S.C. 154(b) by 37 days.

(21) Appl. No.: 10/131,766

(22) Filed: Apr. 23, 2002

(65) Prior Publication Data

US 2003/0196915 A1 Oct. 23, 2003

(51) Int. Cl.⁷ .................................................. A47K 5/08
(52) U.S. Cl. ...................... 206/77.1; 206/457; 220/571; 220/572; 312/229
(58) Field of Search .............................. 206/77.1, 457, 206/361, 362; 312/229; 220/571, 572; 211/16, 85.12

(56) References Cited

U.S. PATENT DOCUMENTS

| | | |
|---|---|---|
| 527,589 A | 10/1894 | Bristol |
| 551,316 A | 12/1895 | Hutchinson |
| 614,827 A | 11/1898 | Bonham |
| 1,273,605 A | 7/1918 | Goldman |
| 1,420,061 A | 6/1922 | Rappeline |
| 1,539,051 A | 5/1925 | McLean |
| 1,820,635 A | 8/1931 | Strickland |
| 1,984,450 A * | 12/1934 | Schleicher .................. 330/154 |
| 2,660,313 A * | 11/1953 | James ...................... 210/323.1 |
| 2,853,349 A | 9/1958 | Wilcox |
| 4,606,576 A | 8/1986 | Jones |
| 4,645,209 A | 2/1987 | Goulter et al. |
| 4,659,099 A | 4/1987 | Malone |
| 4,779,874 A | 10/1988 | Dykstra et al. |
| 4,799,744 A | 1/1989 | Toy |
| 5,055,081 A | 10/1991 | Nayak |
| 5,118,004 A | 6/1992 | Carilli |
| 5,261,541 A * | 11/1993 | Li ............................... 211/62 |
| 5,413,035 A | 5/1995 | Fernandez |
| 5,879,008 A | 3/1999 | O'Rourke |
| 5,964,163 A | 10/1999 | Cohen |
| 5,975,628 A | 11/1999 | Russell |
| 5,984,440 A * | 11/1999 | Watson ........................ 312/206 |
| 6,318,566 B1 | 11/2001 | Davis |
| 6,401,946 B1 * | 6/2002 | Chalasani et al. ........... 211/188 |

* cited by examiner

Primary Examiner—David T. Fidei
(74) Attorney, Agent, or Firm—Heimbecher & Assoc., LLC

(57) ABSTRACT

A selectively configurable household accessory holder capable of being customized through adding and removing a variety of containers to a base. The containers may hold any number of items. The household accessory holder may be configured by removably attaching a variety of containers to the base. The base has a connection means capable of mating with an attachment means on a container bottom. The base has a series of regularly spaced holes drilled in its top while a container has one or more pegs sized to fit into a hole. The container may be aligned on the base so that the peg sits in a hole and secures the container to the base. A user may remove a container by pulling it up so that the peg is removed from the hole. The base is sized such that multiple containers of any shape may be affixed thereto simultaneously.

25 Claims, 9 Drawing Sheets

SELECTIVELY CONFIGURABLE HOUSEHOLD ACCESSORY HOLDER

TECHNICAL FIELD

The invention relates generally to a household container, and more specifically to a selectively configurable holder capable of holding one or more household items.

BACKGROUND OF THE INVENTION

People have cleaned their dwellings since the beginning of time. As mankind has become more civilized, the urge to and necessity for cleaning has only increased. Similarly, more and more cleaning products and tools are available each year. This seemingly endless multiplication of soaps, powders, brushes, sponges, towels, and so forth marches on.

With every new household product purchased, a consumer must find just a bit more space for storage. In a remarkably short time, the number of cleaning products and tools can become overwhelming. Indeed, the clutter induced by attempting to store such items in too small a space may be more distracting than the food, dirt, stains, or unsightly mess such items were designed to eliminate.

In addition, many people are inherent packrats. They save anything and everything, regardless of its utility or value. In short order, desk drawers, cabinets, boxes, closets, and other storage spaces are overflowing with potentially useful items lost in clutter.

Although many organization products have met with remarkable success, few if any are sufficiently adaptable to handle multiple items of differing sizes. Further, many useful items may require specialized storage solutions. For example, sponges and scrub brushes may be extremely wet when put away. Attempting to store such items in a bag, cardboard or metal container, cupboard, or bin, for example, is messy, inconvenient, and would ruin the storage space. These items may also be saturated with soap, cleaning chemicals, dyes, or other discoloring or caustic liquids. Such liquids may mar or otherwise deface many otherwise suitable containers, especially when the liquids can pool in the bottom of a container and sit for an extended time.

Larger containers, such as cupboards, pantries, or shelves, may hold many items. Unfortunately, a common effect of such large storage spaces is disorganization. Needed items often end up shoved to the back of the cupboard or pantry, or stored out of sight behind or under other items.

Individual taste should not be overlooked. Although one person may find an picture attractive, another may dislike that same item. This is as true with storage and organization systems or containers as it is with paintings. The aesthetics of a given container may match one person's home decor, but clash with another's. Thus, even should the above obstacles be overcome, a rigid solution that fails to permit some degree of customization will fail to reach a widespread audience.

Accordingly, there is a need in the art for an improved, selectively configurable household accessory holder.

BRIEF SUMMARY OF THE INVENTION

The present invention is generally a household accessory holder capable of being customized through adding and removing a variety of artifacts, including, for example, containers, holders, and figurines or statuettes. The artifacts may hold any number of items, such as cleaning supplies, kitchen utensils, toothbrushes, soaps, sponges, towels, pens, spare change, and keys, or may be merely decorative. The household accessory holder may be configured to be placed in certain areas and hold certain items, and may be reconfigured for duty as necessary.

For example, when used in a kitchen, the selectively configurable household accessory holder may include a number of containers having drainage means capable of sluicing liquids out of the bottom of the container and into a storage area. Thus, when sponges, scrubbers, or other wet items are placed in a container, the items may drain and dry. A removable drawer or other receptacle may be housed in the base to catch runoff and permit easy disposal.

Continuing the example, the same accessory holder may be reconfigured with a variety of containers having individual drawers or recesses capable of holding small items, such as pens or spare change, but lacking drainage means. When so configured, the selectively configurable household accessory holder may be placed in a den or bedroom and stocked with keys, cufflinks, and so forth.

Generally, the selectively configurable household accessory container comprises a base having a connection means capable of mating with another connection means on the bottom of the aforementioned artifacts. In one embodiment, the base has a series of regularly spaced holes drilled in its top while an artifact has one or more pegs sized to fit into one of the spaced holes. In this manner, the artifact may be aligned on the base so that each peg sits in a hole, thus securing the artifact to the base. When a user desires to remove a particular artifact, he may simply pull the artifact up so that the peg is removed from the hole. Typically, the base is sized such that multiple artifacts may be affixed thereto simultaneously.

Further, artifacts may be formed to take almost any shape. For example, while one artifact may be a simple box, another may take the form of a statuette or decorative figurine. This permits nearly endless variety in the appearance of suitable artifacts and, by extension, the selectively configurable household accessory holder itself. Thus, each user may customize the invention's appearance to his or her taste.

That the present invention meets the needs described above, as well as other advantages, will be apparent upon reading the detailed description, below, with particular reference to the accompanying figures and claims.

DETAILED DESCRIPTION OF THE INVENTION

The Selectively Configurable Household Accessory Holder

Generally speaking, the present invention comprises a selectively configurable and changeable household accessory or implement holder. One or more artifacts, including, for example, holders, containers, trays, and decorative figurines, includes at least one attachment means disposed on its bottom. The attachment means (in one embodiment, a peg) may be sized to fit snugly, but not irremovably, into connection means located on the top surface of the base. The base typically comprises not only a top surface having a plurality of connection means, but also a removable drawer. This drawer may catch water, drippings, and other runoff channeled by a drainage means, such as a hole in the container or peg, from both the artifacts and items placed therein or associated therewith. Such collected runoff may be disposed of efficiently by simply removing and emptying the drawer.

Figure 1:
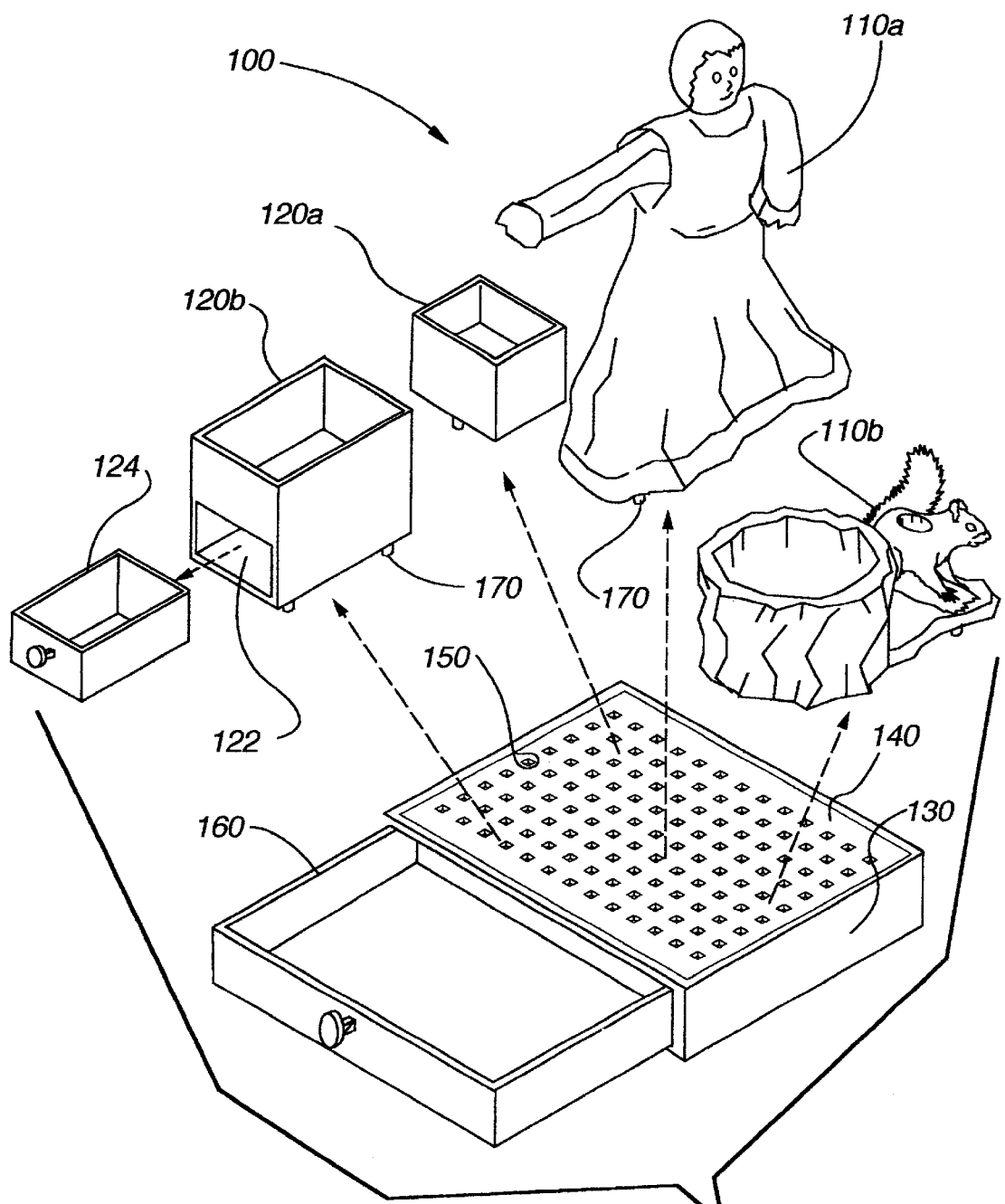
FIG. 1 displays an exploded, isometric view of an embodiment of the present invention.
Figure 5:
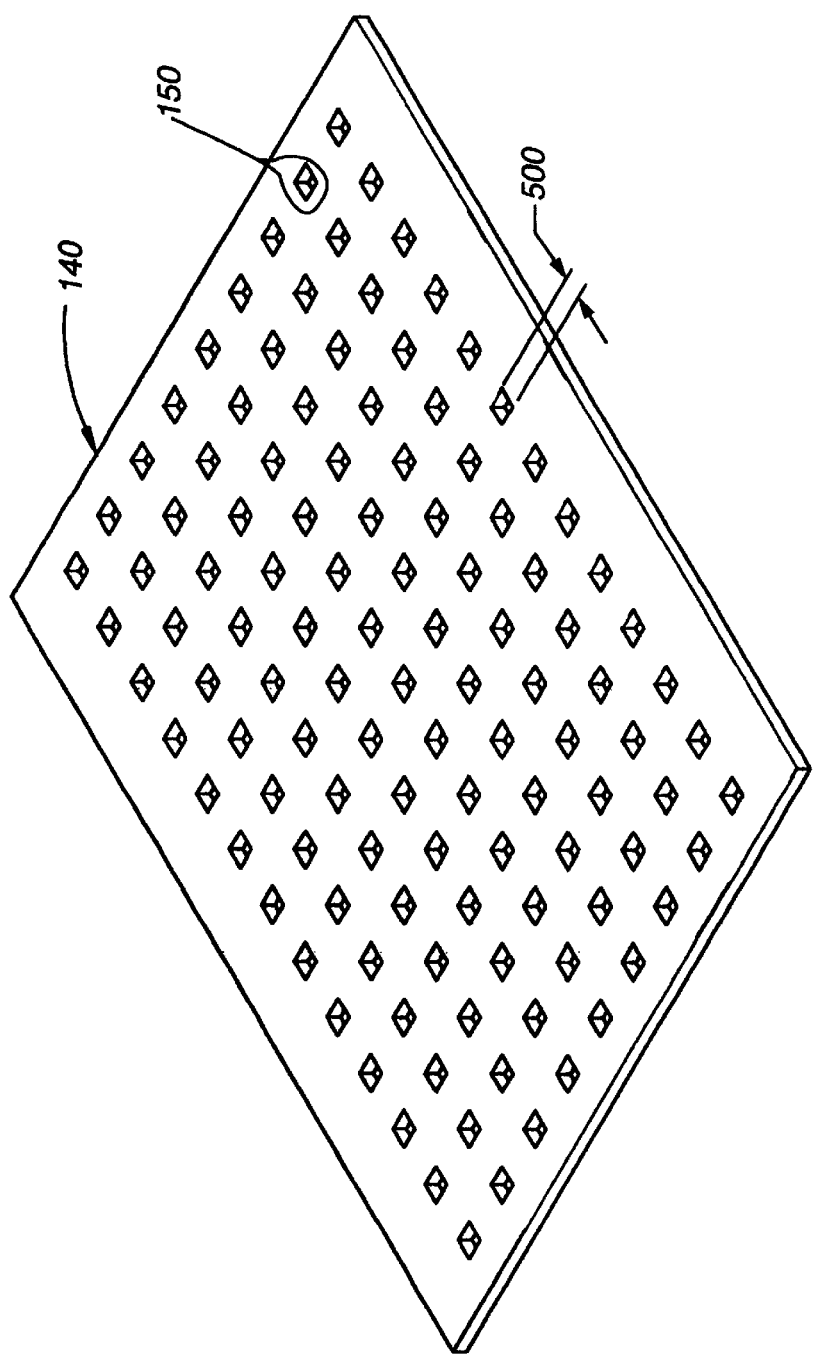
FIG. 5 displays a pegboard forming the top surface of a base in accordance with one embodiment of the present invention.

FIG. 1 is an exploded view of one embodiment of the accessory holder 100 of the present invention. One or more artifacts, for example, decorative figurines 110a, 110b or containers 120a, 120b, may be removably attached to a base 130. Throughout this document, the terms "container 120" and "figure 110" are meant to refer both generally to all containers and figures, and specifically to the group of containers 120a, 120b and figurines 110a, 110b, respectively. Atop the base is a series of spaced holes 150, which may be regularly arranged as shown in FIGS. 1 and 5, or other connection means. The figures and containers may be provided with one or more attachment means 170 sized to fit into or otherwise mate with a connection means 150. The arrows in FIG. 1 indicate one example of where the artifacts 110a, 110b, 120a, 120b may be placed on the base 130.

Generally, the base 130 includes a pegboard 140 or other slotted, drilled, or punched surface having one or more apertures 150 therein. In the present embodiment, these apertures take the form of square holes 150 pressing completely through the pegboard 140 for drainage purposes as further described below. The base may include a drawer 160 to catch runoff and liquid draining through a drainage means (shown to good advantage in, for example, FIGS. 7, 7A, and 7B) from household implements held by the decorative figures 110 and/or containers 120. The drawer may be removed from the base 130 and emptied as necessary.

Figure 2:
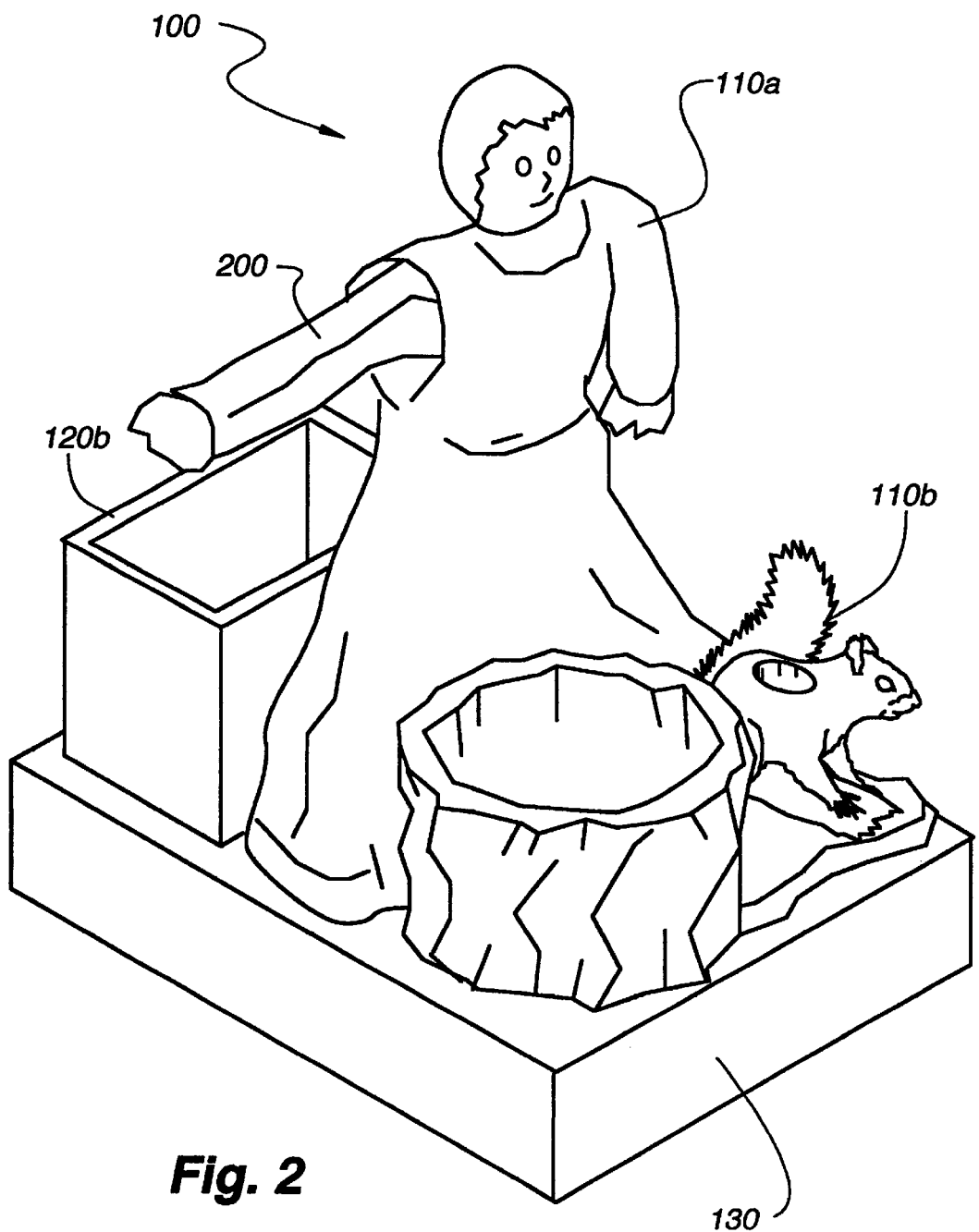
FIG. 2 displays an isometric front view of the embodiment of FIG. 1.

FIG. 2 displays an isometric front view of an embodiment of the present invention. In this view, the artifacts, including containers 120a, 120b and figures 110a, 110b, have been removably attached to the base 130 via the conjunction of the attachment means 170 and connection means 150. Because the selectively configurable household accessory holder 100 is shown with the containers 120 and figures 110 mounted on the base 130, neither the attachment means 170 nor connection means 150 may be seen. Alternate embodiments that employ different connection means and attachment means may have those same elements visible even when artifacts are removably mounted on the base 130. Several alternate connection and attachment means are discussed below, in the section entitled "Connection Means and Attachment Means."

As can be seen in the isometric view of FIG. 2, an arm 200 of the figure 110a is crafted to extend substantially parallel to the top surface of the base. Any container 120a, 120b or figure 110a, 110b may possess a straightened, extended portion similar to the arm 200. Generally, towels, washcloths, and so forth may be draped across the arm 200 for storage and organization. In this manner, towels and washcloths (not shown) may be kept close at hand to other items stored or held by the selectively configurable household accessory holder 100.

In an alternate embodiment, any artifact, such as containers 120a, 120b or figures 110a, 110b, may be crafted to include a triangular portion or hook for storing a towel, rather than an extended portion like the arm 200. A towel may then be draped over the hook or pulled through the center of the triangle in order to rest securely. A triangular portion may be formed, for example, on a figurine similar to lifelike figure 110a, but where the arms of the figurine are molded as though with the hands clasped in front at the waist and extended slightly away from the body to accommodate a towel over the arms with a portion of the towel in the space created between the backside of the figurine arms and the front side of the figurine body. In another example, an arm of the figurine may extend substantially horizontally from the shoulder to the elbow with the elbow bent approximately 90°, resulting in a raised-hand or waving configuration where the bicep of the figure is positioned to support a towel.

Figure 3:
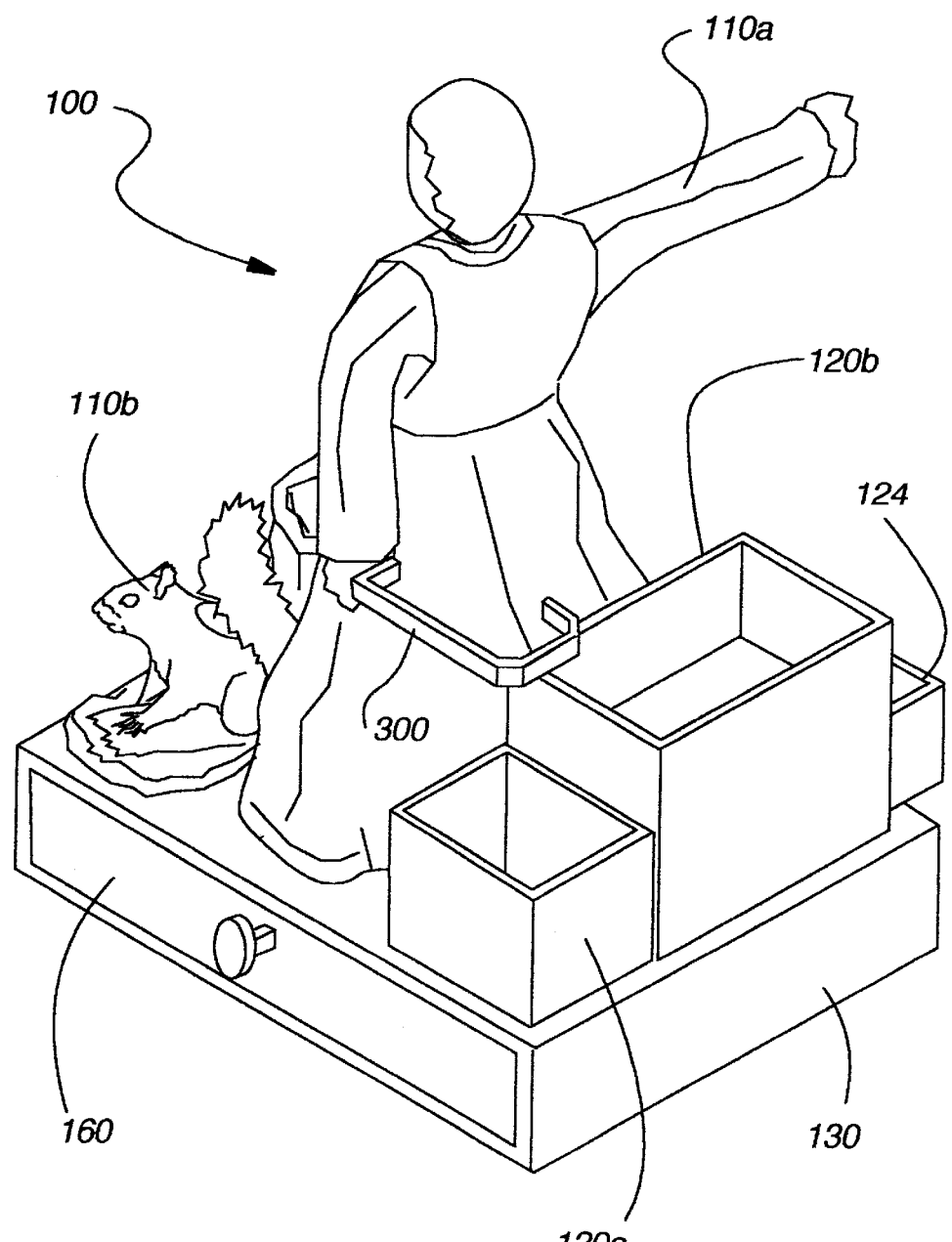
FIG. 3 displays an isometric rear view of the embodiment of FIGS. 1 and 2.

FIG. 3 displays an isometric rear view of the embodiment of FIGS. 1 and 2. Not only does this angle provide a better view of portions of the selectively configurable household accessory holder 100 (such as the drawer 160), but also displays a hook 300 projecting rearwardly from the decorative figure 110a. The hook 300 may hold upright a brush, scrubber, soap bottle, or other utensil. Because the hook is located behind the body of the figure 110a in this embodiment, the figure body generally hides from frontal view a utensil or item placed inside the hook. Thus, messy or unsightly items may be held upright and organized by the hook 300 without impacting the overall look of the selectively configurable household accessory holder 100. Further, the hook 300 may comprise an integral portion of the figure 110a itself, such as a rearwardly projecting leg, a tail, and so forth. Alternately, the hook 300 may be positioned vertically instead of horizontally as shown, so that the end portion of the hook faces upward instead of to the side. If the hook 300 supports a decorative utensil or item, the hook 300 may be arranged to extend to the side or front of the FIG. 110a.

Figure 4:
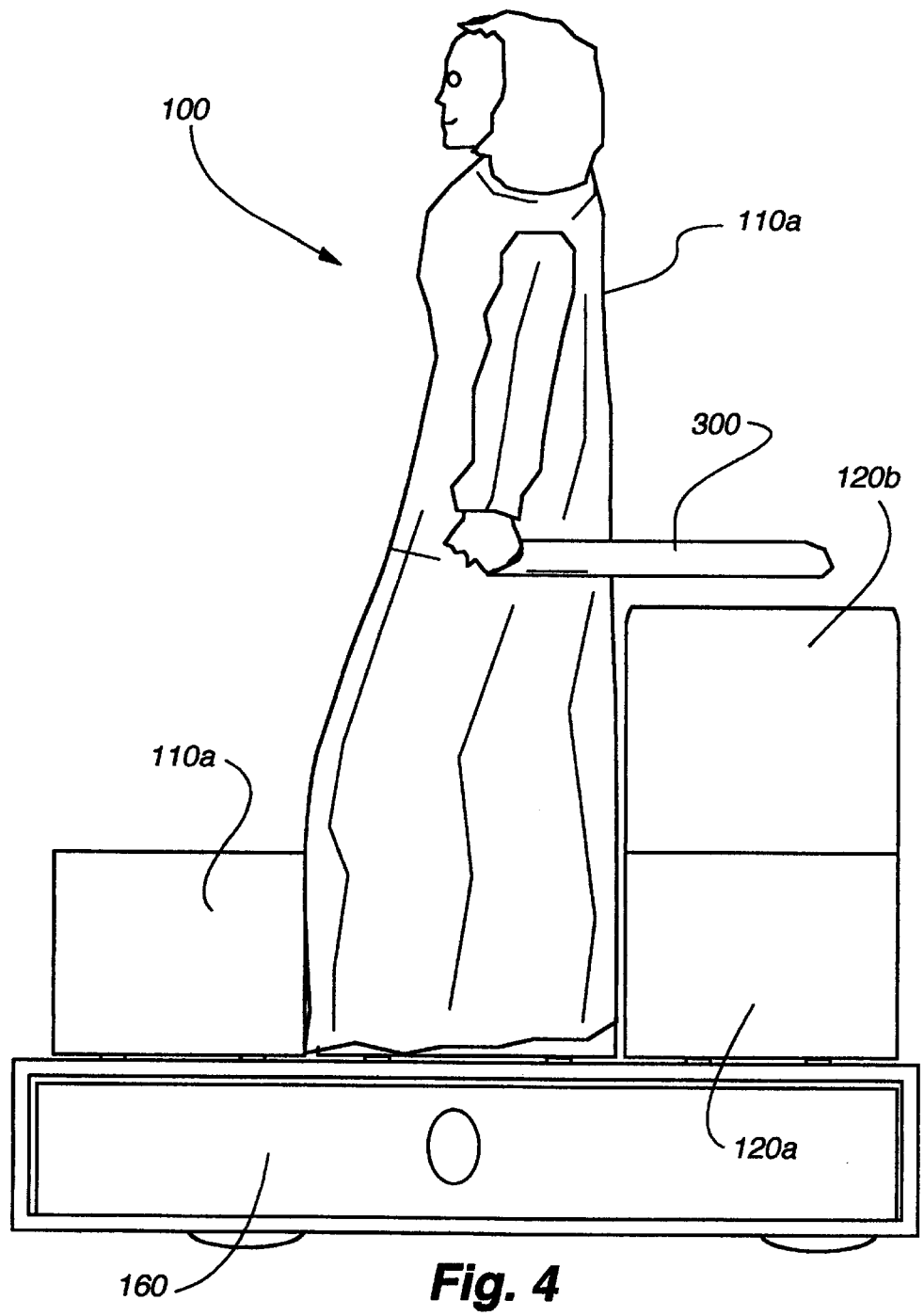
FIG. 4 displays a side view of the embodiment of FIGS. 1–3.

FIG. 4 displays a side view of the selectively configurable household accessory holder 100, with the various figures 110a, 110b and containers 120a, 120b arranged as shown in FIGS. 1–3. Although FIGS. 1–4 have shown the holder 100 with a single arrangement of containers 120 and figures 110, many permutations are, however, possible. Because the containers and figures may be removed from the base 130 at will, they may be swapped and repositioned to suit a user of the present invention 100. Further, many differently shaped containers 120 or figures 110 may be used with the base 130, depending on the aesthetic or end use desired. For example, a container 120 having small drawers built in to store knickknacks or change may be added to the base 130 when the accessory holder 100 is intended for use in a study or bedroom. Similarly, a decorative figure 110 or container 120 having multiple openings in its top may be attached to the base 130 to serve as a toothbrush holder when the present invention 100 is placed in a bathroom. Accordingly, it should be understood that the arrangement shown in FIGS. 1–4 is but one of many possible for the selectively configurable household accessory holder 100.

Typically, the selectively configurable household accessory holder and all its constituent elements are sized to be easily portable by a single person, whether in a configured or unassembled state.

Because the artifacts are removable, they may be freely swapped and repositioned as desired. This permits a user to configure an embodiment of the invention in almost any manner desired. Thus, the embodiment may be changed for aesthetic, space, or utensil holding reasons.

Connection Means and Attachment Means

FIG. 5 displays a pegboard 140 comprising the top surface of the portable base 130 in the present embodiment. As can be seen, in the present embodiment the square holes 150 are uniformly spaced across the pegboard 140. Generally, the holes 150 have approximately the same length and width as the pegs 170 on the bottom of the figures 110 and/or container 120. In this manner, pegs may be easily inserted into and removed from the holes 150. Alternate embodiments may space the holes 150 differently. For example, the holes may be spaced further apart along the long axis of the pegboard 140 than they are spaced apart along the short axis, or may be placed in a staggered pattern. Further, alternate embodiments may include a pegboard having different shaped holes (such as elongated slots or circular holes) rather than the square holes 150 depicted in FIGS. 1 and 5.

Figure 6:
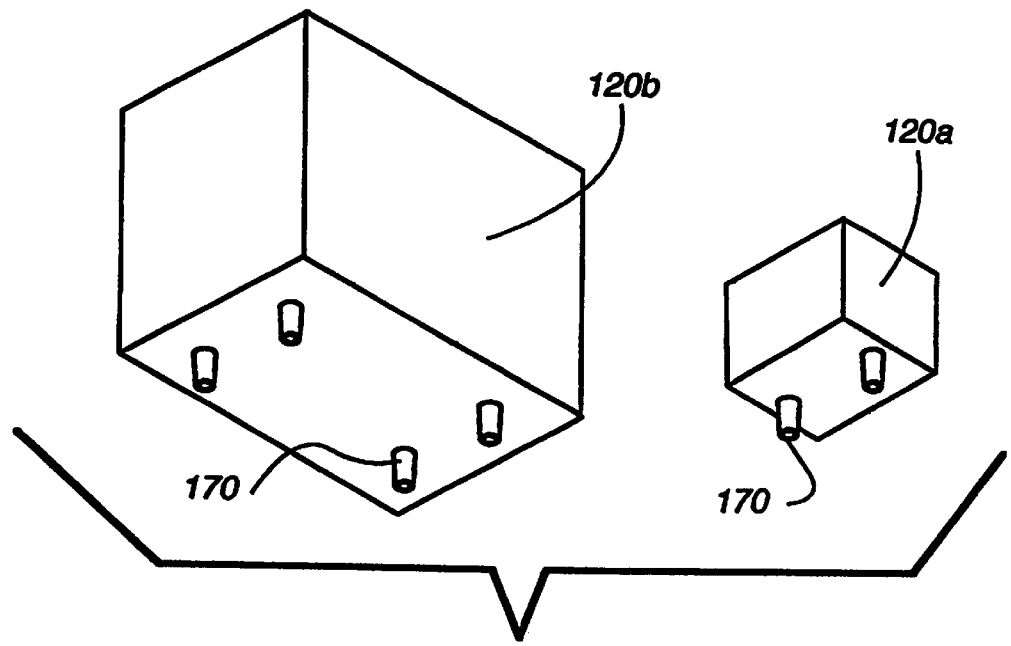
FIG. 6 displays an isometric view of the bottom of a pair of containers suitable for use with an embodiment of the present invention.

FIG. 6 displays a bottom-up isometric view of two containers 120a, 120b. Mounted to the bottom of the containers are one or more attachment means, such as pegs 170. Although the pegs 170 used in the present embodiment are round and tapered, alternate embodiments may use differently-shaped pegs. The pegs, for example, may be square or rectangular, and they may be of a constant cross-section rather than being tapered. Further, in the event that the holes 150 are differently shaped in an alternate embodiment, the pegs 170 may have corresponding shapes. For example, an alternate embodiment may include both triangular holes 150 in the pegboard 140 and triangular pegs 170 attached to a container 120. Of course, alternate embodiments may also have attachment means and connection means of differing shapes, as is the case with the present embodiment.

Generally, in the present embodiment, the cross-sectional diameter 710 (FIG. 7) diameter of a peg 170 at its largest point approximately matches the length 500 (FIG. 5) of a sidewall of a hole 150. This relationship is shown schematically in FIG. 7A. When a peg 170 is inserted into a hole 150, the hole sidewalls may contact portions of the peg, thus holding it in place. Because the peg's 170 diameter is not greater than the length or width of the hole 150, the peg may be seated without forcing it into place. This, in turn, permits a user to easily remove the container 120 or figure 110 by simply pulling the item (and attached peg 170) away from the pegboard 140.

Although the present embodiment attaches four pegs 170 to the underside of a large container 120b and two pegs 170 to the underside of a small container 120a (see FIG. 6), alternate embodiments may use more or fewer pegs per container. Further, alternate embodiments may include one or more containers 120 or decorative figures 110 having pegs attached to surfaces other than their undersides, such as a side or top surface. This may be used in an embodiment intended to hang from a wall, for example.

Alternate embodiments may also use attachment means 170 other than pegs and holes. For example, an alternate embodiment may use VELCRO strips, T-shaped connectors, threaded screws, or a bayonet and matching channel to connect a container 120 or figure 110 to the base 130. Any means known to those skilled in the art for removably securing a container to the base is contemplated by the present invention.

Drainage Means

Figure 7:
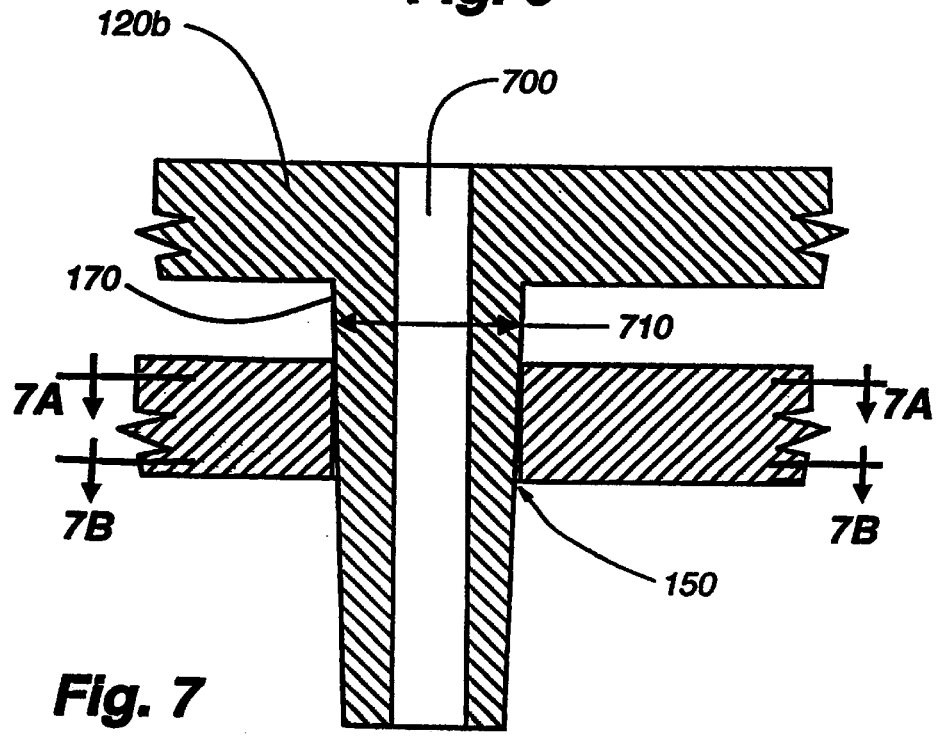
FIG. 7 displays a cross-sectional view of an artifact attached to the pegboard of FIG. 5.

FIG. 7 displays a fragmentary cross-sectional view of the bottom surface of a container 120 attached to the pegboard 140 via a peg 170 inserted into a hole 150. As may be seen, the outer wall of the peg 170 contacts the sides of the hole 150. Because the diameter of the peg 170 increases slightly along the length of the peg from its distal tip to its joinder point with the container 120, the peg's outer wall only touches the sidewalls at the hole 150 adjacent to the top surface of the pegboard 140. This allows the container 120 or decorative figure 110 to be firmly secured to the base 130, but minimizes the force necessary to dislodge the peg 170 from the hole 150.

As can be seen in cross-section (FIG. 7), the pegs 170 of the present embodiment include a hollow central tunnel 700, which serves as one embodiment of a drainage means. The tunnel 700 extends all the way into the bottom of the container 120 or figure 110. Generally, when a container 120 is removably mounted to the base 130, the peg 170 extends through the pegboard 140 and into the interior of the base 130. Because the drainage means 700 runs the length of the peg and into the container bottom, liquids or collected items that would otherwise gather in the container may be channeled through the tunnel 700 and drain into the interior of the base 130. This prevents build-up of undesired material in the containers 110 or figures 120. In the present embodiment, the runoff gathers in the drawer 160 partially located in the interior of the base 130. Alternate embodiments may have different means for gathering runoff, such as a disposable sack.

Figure 7A:
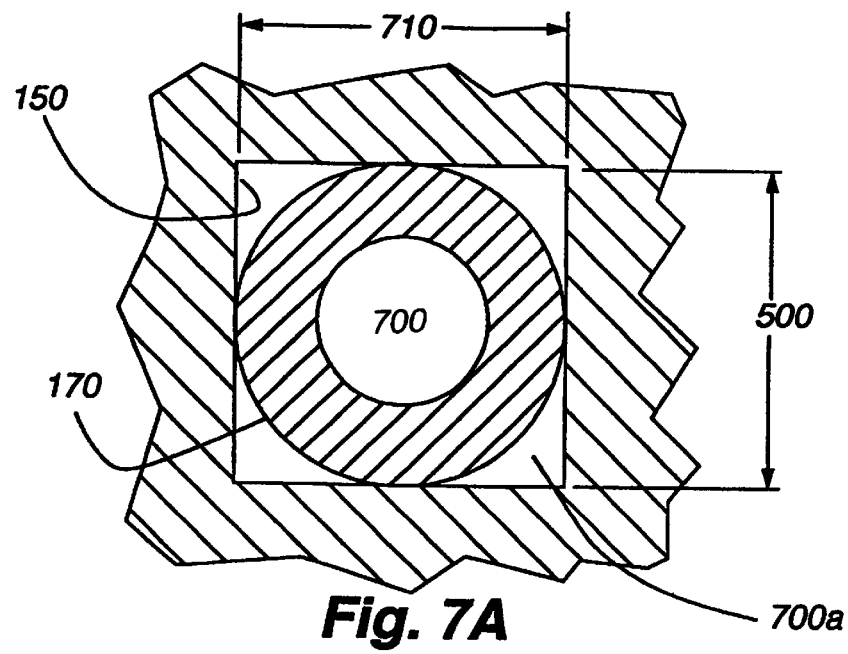
FIG. 7A displays a cross-sectional view taken along line 7A—7A of FIG. 7.

FIG. 7A shows a cross-sectional view taken through line 7A—7A of FIG. 7. As can be seen, the use of a round peg 170 in a square hole 150 creates gaps or spaces 700a in the corners of the hole. These spaces 700a serve as an additional drainage means, permitting liquids and other debris that collect on the surface of the pegboard 140 to flow down the hole 150 and into the drawer 160 or interior of the base 130.

Figure 7B:
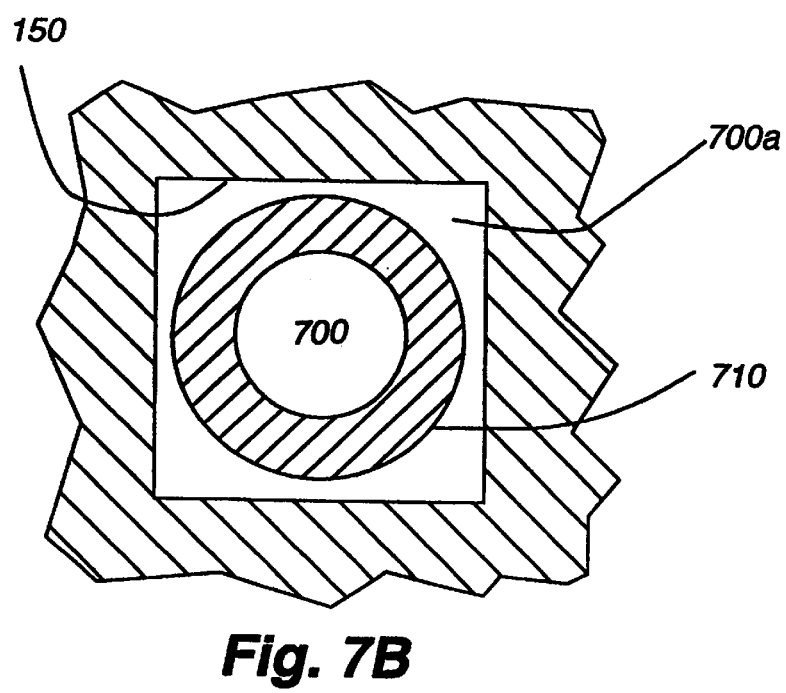
FIG. 7B displays a cross-sectional view taken along line 7B—7B of FIG. 7.

Further, because the peg 170 tapers along its length, the size of the space 700a increases with the depth of the hole. FIG. 7B is a cross-sectional view taken along line 7B—7B of FIG. 7, and shows that the spaces 700a may increase in size as one moves from the top surface of the pegboard 140 to its bottom surface. This helps ensure that any particles contained in the runoff do not become wedged in the space 700a, but instead pass through.

Further, alternate embodiments may employ a different type of drainage means. For example, holes or tunnels 700 may be drilled through the base of a container 120 or figure 110 in locations other than those directly above a peg 170. When properly spaced, the tunnels may align with the holes 150 in the pegboard 140 once the container 120 is removably affixed to the base 130. If the holes 150 are regularly spaced, the tunnels 700 drilled through the base of each container 110 may be easily positioned by using the pegs 170 on the container bottoms as a reference point. When the container 120 and base 130 are connected, each peg 150 must fit into a corresponding hole 150 on the pegboard 140. Thus, the relative positions of other holes on the pegboard to the peg is always a known factor.

Further Views of the Selectively Configurable Household Accessory Holder

Figure 8:
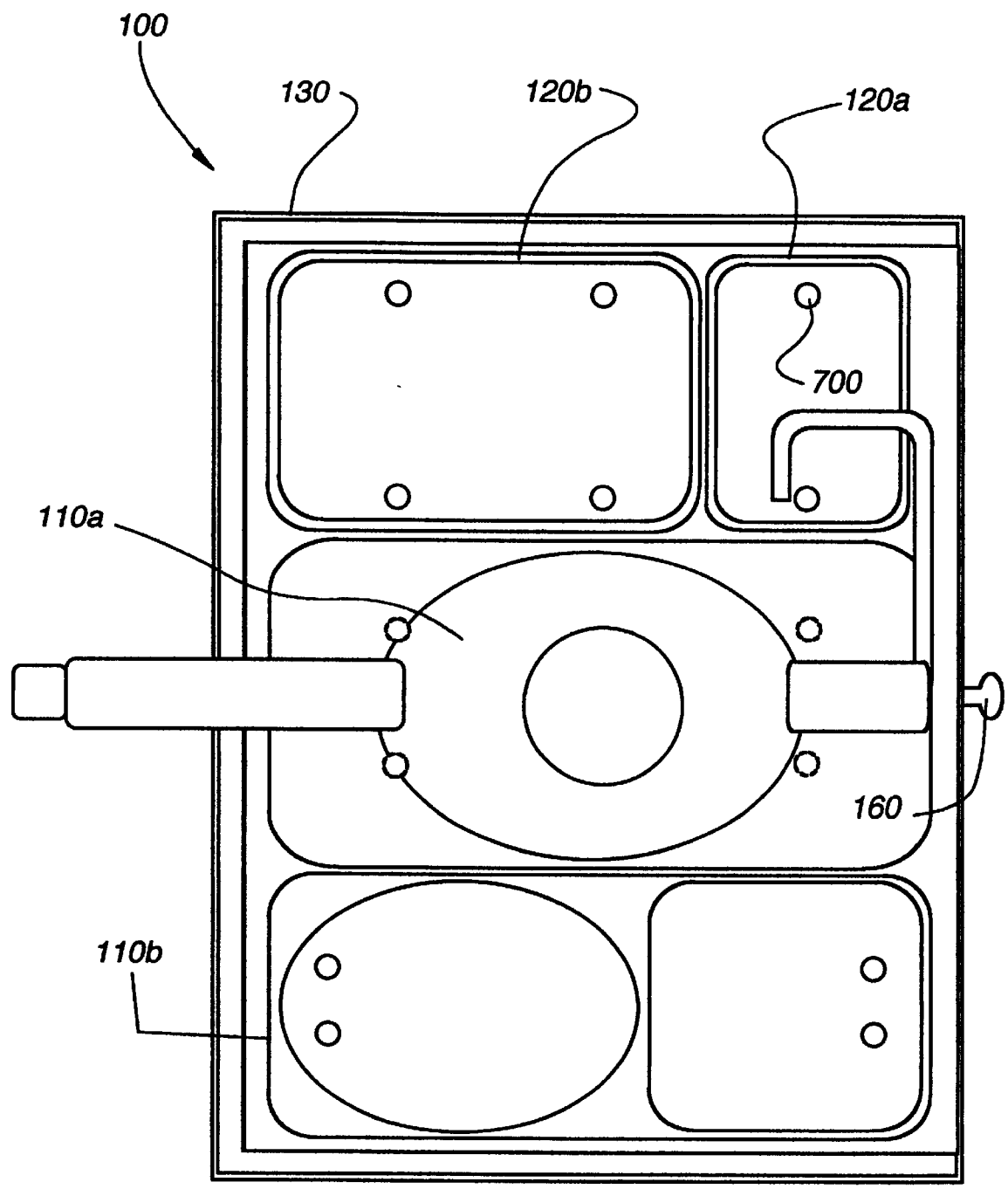
FIG. 8 displays a top-down view of an embodiment of the present invention showing the location of the pegs attaching various containers to the base.

FIG. 8 displays a top-down view of one embodiment of the selectively configurable household accessory holder 100. The positioning of the various artifacts, including decorative figures 110a, 110b and containers 120a, 120b, corresponds to the positions shown in FIGS. 1–4. In this top-down view, the position of the various drainage means 700 may be seen in the bottom of each container.

Figure 9:
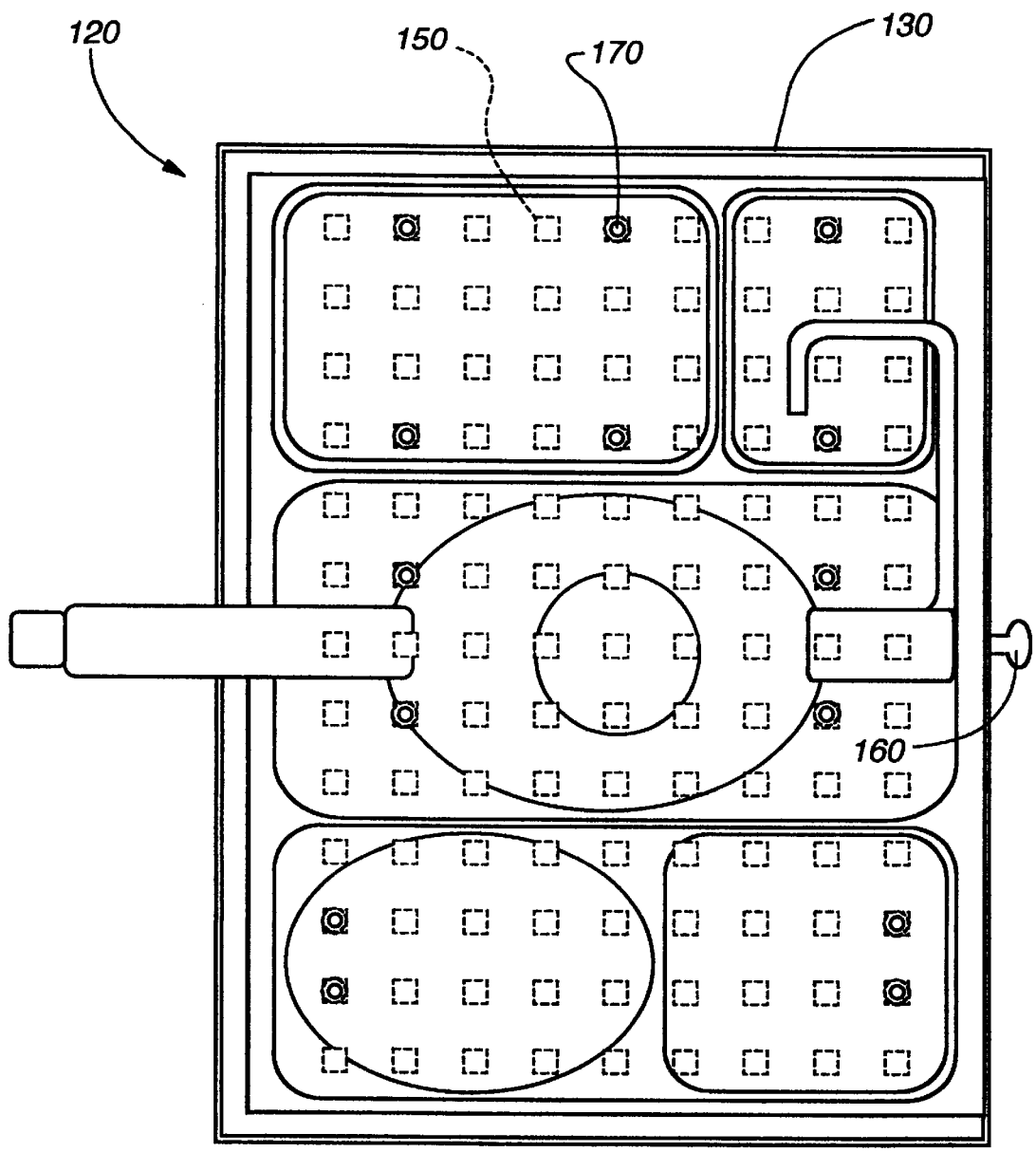
FIG. 9 displays a top-down view of the embodiment of FIG. 8, showing the locations of the holes in the base beneath the containers.

FIG. 9 displays the same top-down view as FIG. 8, but with the locations of the various holes 150 through the pegboard 140 marked as dashed boxes. Those holes 150 filled with pegs 170 are shown as dashed boxes with solid circles inside. As can be seen, the number of holes affords ample opportunity to reposition the decorative figures 110 and containers 120 as necessary atop the base 130, thus creating a variety of looks and useful configurations.

Conclusion

As will be recognized by those skilled in the art from the foregoing description of example embodiments of the invention, numerous variations on the described embodiments may be made without departing from the spirit and scope of the invention. For example, different connection and attachment means may be used, or containers having special functionality may be provided. For example, a decorative figurine may be hollow and include a cap or top in order to double as a liquid dispenser or container. Further, while the present invention has been described in the context of specific embodiments, such descriptions are intended by way of example and not limitation. Accordingly, the proper scope of the present invention is specified by the following claims.

I claim:

1. A selectably configurable household accessory holder, comprising:
   a base having a connection means comprising a plurality of regularly spaced holes in a top surface of the base;
   an artifact having an attachment means for removably connecting to the connection means, the artifact suitable for holding a household accessory; and
   a drainage means physically and operably connected to the artifact, the drainage means permitting liquid to flow from the artifact to the base.

2. The accessory holder of claim 1, wherein the artifact is a container.

3. The accessory holder of claim 2, further comprising a removable drawer for collecting the liquid, the drawer located in an interior of the base.

4. The accessory holder of claim 3, wherein the drainage means comprises at least one hole in the container.

5. The accessory holder of claim 2, wherein
   the attachment means comprises a peg affixed to a bottom of the container, the peg sized to fit within one of the plurality of regularly spaced holes.

6. The accessory holder of claim 5, wherein the drainage means comprises a tunnel extending through the bottom of the container and through the interior of the peg.

7. The accessory holder of claim 6, further comprising a receptacle located in an interior compartment of the base, the interior compartment in fluid communication with the plurality of regularly spaced holes in the top surface of the base, the interior compartment for catching liquid flowing along the drainage means.

8. The accessory holder of claim 7, wherein the receptacle comprises a removable drawer.

9. The accessory holder of claim 5, wherein the drainage means comprises an aperture in the bottom of the container spaced in such a manner that, when the attachment means is connected to the connection means, the aperture in the bottom of the container aligns within one of the plurality of regularly spaced holes in the top surface of the base.

10. The accessory holder of claim 5, wherein the plurality of regularly spaced holes forms a grid pattern.

11. The accessory holder of claim 1, wherein the artifact comprises a decorative figure.

12. The accessory holder of claim 1, wherein the artifact further comprises an integral means for supporting a household accessory.

13. The accessory holder of claim 12, wherein the integral supporting means extends from a first side of the artifact such that when the artifact is viewed from a second side of the artifact opposite the first side, the supporting means and the household accessory supported thereby are concealed from view.

14. The accessory holder of claim 1, wherein the connection means may accept a plurality of attachment means.

15. The accessory holder of claim 1, wherein the integral supporting means comprises a hook attached to the artifact.

16. The accessory holder of claim 1, wherein the connection means comprises a channel and the attachment means comprises a bayonet.

17. The accessory holder of claim 1, wherein the base is portable.

18. The accessory holder of claim 1, wherein the drainage means comprises a space defined by the difference between the cross-sectional shape of the connection means and the cross-sectional shape of the attachment means.

19. A selectably configurable household accessory holder comprising:
   a portable base having a top and an interior, wherein a plurality of regularly spaced holes are set in the top of the base;
   a first artifact having a hollow peg sized to be removably inserted into one of the plurality of regularly spaced holes, the artifact suitable for holding a household accessory;
   a decorative figure having a hollow peg sized to be removably inserted into one of the plurality of regularly spaced holes and a hook attached to a first side of the figure, the hook suitable for holding a household accessory in such a manner that the decorative figure obscures the household accessory when viewed from a second side of the decorative figure opposite the first side; and
   a drawer removably inserted into the interior of the portable base and defining a sidewall of the base, the drawer positioned beneath the plurality of regularly spaced holes.

20. A selectably configurable household accessory holder, comprising:
   a portable base having a top and an interior, wherein a plurality of regularly spaced holes are set in the top of the base;
   a container having at least one peg sized to be removably inserted into one of the plurality of regularly spaced holes, the container suitable for holding a household accessory;
   wherein the container further comprises:
      a first, second, thirds and fourth sidewall joined by a base, the first, seconds third, and fourth sidewalls and base defining an interior cavity, the first sidewall having an aperture therein; and
      a drawer sized to slidably fit within the interior cavity, the drawer having a front sized to fit within the aperture of the first sidewall.

21. The accessory holder of claim 2, wherein at least one surface of the container comprises a decorative surface.

22. The accessory holder of claim 1, further comprising a receptacle located in an interior compartment of the base, the interior compartment in fluid communication with the drainage means, the interior compartment for catching liquid flowing through the drainage means.

23. The accessory holder of claim 22, wherein the receptacle comprises a removable drawer.

24. A selectably configurable household accessory holder, comprising:
- a base having a connection means comprising a plurality of regularly spaced holes in a top surface of the base;
- an artifact having an attachment means for removably connecting to the connection means, wherein
  - the artifact comprising a container suitable for holding a household accessory; and
  - the attachment means comprises a peg affixed to a bottom of the container, the peg sized to fit within one of the plurality of regularly spaced holes; and
- a drainage means operably connected to the artifact, wherein the drainage means comprises a tunnel extending through the bottom of the container and through the interior of the peg permitting liquid to flow from the artifact to the base.

25. A selectably configurable household accessory holder, comprising:
- a base having a connection means comprising a plurality of regularly spaced holes in a top surface of the base;
- an artifact having an attachment means for removably connecting to the connection means, wherein
  - the artifact comprising a container suitable for holding a household accessory; and
  - the attachment means comprises a peg affixed to a bottom of the container, the peg sized to fit within one of the plurality of regularly spaced holes; and
- a drainage means operably connected to the artifact, wherein the drainage means comprises an aperture in the bottom of the container spaced in such a manner that, when the attachment means is connected to the connection means, the aperture in the bottom of the container aligns within one of the plurality of regularly spaced holes in the top surface of the base permitting liquid to flow from the artifact to the base.

\* \* \* \* \*